March 24, 1970 W. E. KOONS, JR 3,502,019
SPIT BALANCE
Filed July 9, 1968
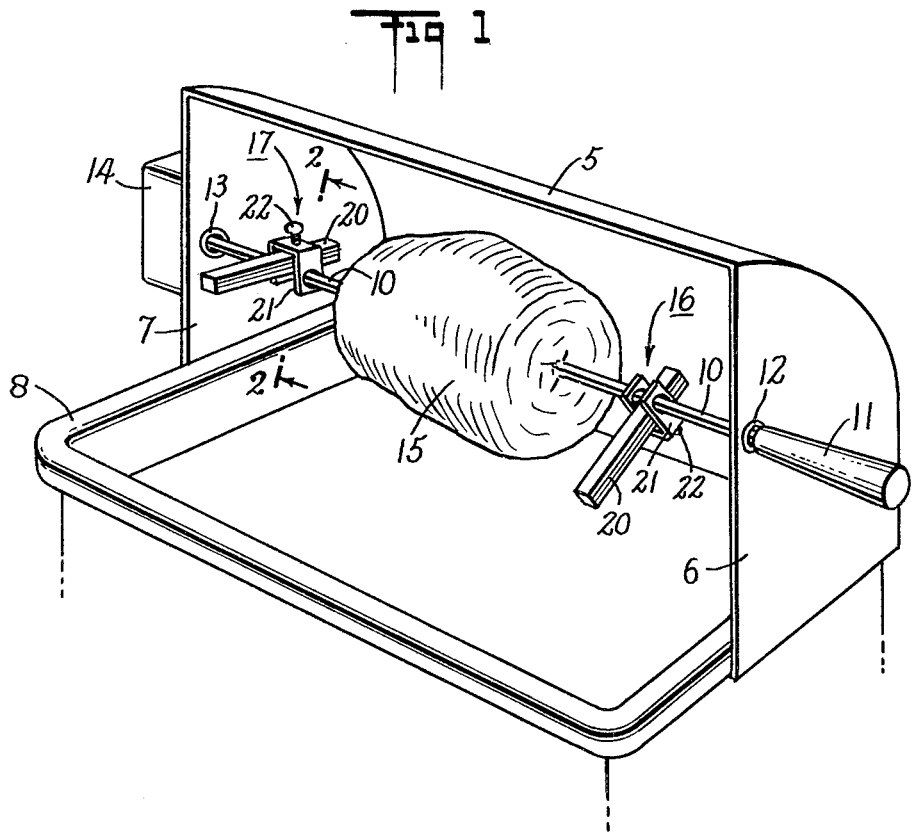
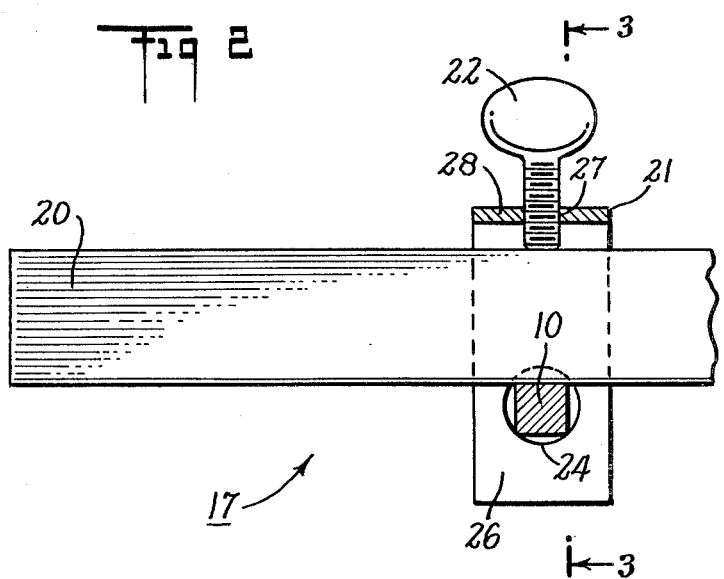
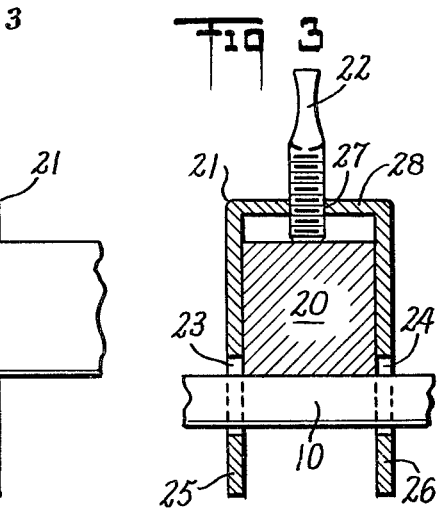
INVENTOR
Walter E. Koons, Jr.
BY
Blair Buckles Cesari & St. Onge
ATTORNEYS

United States Patent Office 3,502,019
Patented Mar. 24, 1970

3,502,019
SPIT BALANCE
Walter E. Koons, Jr., 436 Pepper Ridge Road,
Stamford, Conn. 06905
Filed July 9, 1968, Ser. No. 743,358
Int. Cl. A47j 37/04
U.S. Cl. 99—421                                                  4 Claims

ABSTRACT OF THE DISCLOSURE

A slidably adjustable weight bar in combination with a U-shaped yoke carrying a locking thumb screw is adapted to be mounted on a barbecue spit as an adjustable counterweight for compensating any unbalance in weight distribution of food skewered on the spit. The spit shaft may normally have a rectangular cross-section passing through a pair of aligned circular holes in opposite arms of the yoke, the circular openings being of a larger diameter than the diagonal cross-section of the spit shaft whereby the unclamped balance may be rotated through 360°, and the weight bar may be securely clamped in any angular position, and also may be shifted radially with respect to the axis of the spit shaft to effect the required uniform balance of weight about the axis of rotation.

BACKGROUND OF THE INVENTION

A common problem in the use of motor driven rotisseries and home barbecue spits is in mounting and maintaining large masses of meat products with uniform weight distribution around the axis of the spit shaft which is passed through the food. Due to the irregular shapes, different distributions of fat and bone, etc., of food products such as turkeys, roasts or other meats suitable for rotisserie cooking, it is seldom possible merely by visual judgment to insert the spit skewer through the exact center of gravity of the food to be barbecued. Thus, lack of uniform rotating results as the spit may turn more slowly during those portions of its rotating cycle when it is lifting excess weight on one side of its axis, and it may turn more rapidly during the half cycle when the unbalanced weight load is moving with the force of gravity rather than against it. Even when the initial application of the spit to the uncooked meat is reasonably close to the center of gravity, this condition of near balance may, and usually does, shift during the process of cooking as the fatty portions are rendered and the juices are driven out of more fibrous portions of the meat. This shifting center of gravity of meat during cooking makes it necessary to maintain closer surveillance of the rotisserie operation than otherwise would be desirable. Unless closely attended, the increasing imbalance of weight may result in the meat falling off of the spit into the fire, or even may strip the gears of the motor drive due to the excess load imposed.

Heretofore the only known remedies to the above-discussed problems have been to remove the meat from the spit and to re-skewer in an effort to obtain more central distribution of weight about the rotating axis. This, of course, is tedious, time-consuming as well as messy, and even unsanitary.

Accordingly the principal object of my invention is to provide a simple, inexpensive, readily adjustable counterweight which can be manually adjusted from time to time during barbecuing with a rotisserie, without the necessity of removing the food from the spit.

Other objects of the invention will in part be obvious and will in part appear hereinafter.

The invention accordingly comprises an article of manufacture possessing the features, properties, and the relation of elements which will be exemplified in the article hereinafter described, and the scope of the invention will be indicated in the claims.

For a fuller understanding of the nature and objects of the invention, reference is now made to the drawings in which corresponding reference numerals identify corresponding parts throughout the several views:

FIGURE 1 is a perspective view of a motor driven rotisserie spit over a barbecue grill showing a typical use of two balances according to the invention;

FIGURE 2 is a cross-sectional view taken along the line 2—2 of FIGURE 1 showing a portion of the balance bar and its relationship to the clamp yoke on the shaft of the rotisserie spit; and FIGURE 3 is a cross-section taken along the line 3—3 of FIGURE 2 further illustrating the cooperating relation between the spit skewer, the balance bar, the yoke and the clamped skewer.

DETAILED DESCRIPTION

Referring now in greater detail to FIGURE 1 of the drawing it will be seen that a rotisserie hood 5, having opposed substantially parallel vertical end walls 6 and 7, is supported upon a barbecue grill 8. A spit shaft 10, having a handle 11, is passed through and journaled in bearing holes 12 and 13 in end walls 6 and 7, respectively. On the exterior of end wall 7 is mounted a rotary drive motor 14 with which one end of spit shaft 10, opposite the handle end 11, engages to impart rotation to shaft 10 about its longitudinal axis. An irregularly shaped portion of food, such as a meat roast, is indicated at 15 skewered upon the central section of shaft 10. Clamped to the shaft 10, on either side of the food product 15, are one or more of the spit balances of the invention as indicated generally at 16 and 17 in the perspective view of FIGURE 1.

Reference is now made to FIGURE 2 and FIGURE 3 of the drawing for a more detailed description of the balance construction according to the present invention. A rectangular bar of heavy material 20 is preferably formed of iron or steel bar stock, such as cold rolled steel, and is plate with nickel or chromium to prevent surface oxidation and to facilitate cleaning. In the preferred embodiment bar 20 is cut from one inch square bar stock and is made approximately six inches in length as this has been found to provide sufficient weight for the purpose, although it will be understood that these dimensions are not critical but variations may be made within the scope of the invention. A U-shaped yoke 21 having aligned circular holes 23 and 24 through its opposite arms 25 and 26 is provided with a thumb screw 22 threadably engaged through a tapped hole 27 in its base portion 28. Yoke 21 is slidably mounted upon spit shaft 10 by passing the shaft 10 through the holes 23 and 24.

It is to be noted that the circular holes 23 and 24 are larger in diameter than the diagonal dimension of the cross-section of square shaft 10, as shown in FIGURE 2, whereby the yoke bracket 21 is easily slipped onto the spit shaft 10, normally fits loosely on shaft 10, and is free to rotate about the longitudinal axis of shaft 10. However, when weight bar 20 is inserted through yoke 21 between the spit shaft 10 and thumb screw 22, as shown in FIGURE 2 and FIGURE 3, and the screw 22 is tightened against bar 20, the entire combination is thereby clamped to the shaft 10. To adjust the desired degree of counterbalance for offsetting the uneven distribution of weight of food skewered on the spit 10, the screw 22 is merely loosened and the bar 20 is slidably moved either to the right or left as viewed in FIGURE 2, depending upon the direction and amount of correction required.

Experience with the device illustrated has proven that one or two such adjustments, made empirically, is usually sufficient to provide proper balance for uniform rotissering. As the cooking process progresses, if the rendering of fat produces a new distribution weight causing unbalance, all that is required to restore balance is a momentary stopping of the motor 14 and a simple readjustment of the balance weights 16 and 17 as shown in FIGURE 1. While I prefer to use two spit balances 16 and 17 as shown in FIGURE 1, because this makes it easier to obtain perfect balance with a minium of effort, it is to be understood that the objects of the invention can be achieved by using only one balance on the spit shaft.

It will thus be seen that the objects set forth above, among those made apparent from the preceding description, are efficiently attained and, since certain changes may be made in the above product without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. In combination with a barbecue rotisserie including a rotatable spit, balance means comprising,
    (A) a slidably adjustable bar weight,
    (B) a U-shaped yoke having
        (1) a pair of aligned circular holes through opposed arms thereof,
            (a) said holes being of a diameter greater than the diagonal cross-section of said spit whereby said spit may freely pass through said aligned holes,
        (2) clearance between said spit engaging holes and the closed end of said yoke for slidably receiving said adjustable bar weight, and
    (C) clamping means on the closed end of said yoke for releasably holding said bar weight in engagement with said spit at any preselected position with respect to said spit.

2. The combination of claim 1 wherein said clamping means comprises a manually operable set screw threadably engaged with said yoke for clamping engagement of said bar weight with said spit.

3. A rotisserie spit balance comprising in combination,
    (A) a flat sided metallic bar weight of substantially uniform cross-section,
    (B) a yoke having a pair of oppositely disposed aligned circular holes through opposed arms thereof and adapted to pass a spit skewer therethrough,
        (1) said yoke providing a space adjacent said holes and between said arms for slidable passage of said bar weight therethrough, and
    (C) manually operable clamping means on said yoke for releasably holding said bar weight in rigid engagement with a spit skewer passed through said aligned holes.

4. A spit balance as defined in claim 3 wherein said bar weight is substantially rectangular in cross-section, and said clamping means comprises a thumb screw threadably passing through a portion of said yoke into engagement with a flat surface of said rectangular bar weight.

References Cited

UNITED STATES PATENTS

| | | | |
|---|---|---|---|
| 3,143,003 | 8/1964 | Schmitt | 99—421 |
| 3,298,247 | 1/1967 | Juno | 99—419 |

ROBERT W. JENKINS, Primary Examiner

U.S. Cl. X.R.

74—573